(12) United States Patent
Knittle

(10) Patent No.: US 8,904,027 B2
(45) Date of Patent: Dec. 2, 2014

(54) ADAPTIVE BIT RATE FOR DATA TRANSMISSION

(75) Inventor: Curtis Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 322 days.

(21) Appl. No.: 12/827,410

(22) Filed: Jun. 30, 2010

(65) Prior Publication Data

US 2012/0005361 A1    Jan. 5, 2012

(51) Int. Cl.

| | |
|---|---|
| G06F 15/16 | (2006.01) |
| H04L 12/26 | (2006.01) |
| H04N 11/02 | (2006.01) |
| H04N 21/2662 | (2011.01) |
| H04L 12/66 | (2006.01) |
| H04L 12/825 | (2013.01) |
| H04W 28/02 | (2009.01) |
| H04N 21/24 | (2011.01) |
| H04L 29/06 | (2006.01) |
| H04N 21/6373 | (2011.01) |
| H04N 21/647 | (2011.01) |

(52) U.S. Cl.
CPC ............... *H04L 12/66* (2013.01); *H04L 65/80* (2013.01); *H04N 21/2662* (2013.01); *H04N 21/6373* (2013.01); *H04L 47/25* (2013.01); *H04W 28/0289* (2013.01); *H04L 29/06027* (2013.01); *H04N 21/64769* (2013.01); *H04N 21/2402* (2013.01)
USPC ......... 709/232; 725/96; 370/229; 375/240.02

(58) Field of Classification Search
CPC .......... H04N 21/2662; H04N 21/2402; H04N 21/6373; H04N 21/238–21/2385; H04N 21/64769; H04W 28/0289; H04L 65/60–65/80; H04L 29/06027; H04L 47/2416; H04L 47/2491; H04L 47/25; H04L 47/38; H04L 1/0001–1/0022
USPC .................... 709/231–235; 375/240–240.07; 370/229–240; 725/95, 96
See application file for complete search history.

(56) References Cited

U.S. PATENT DOCUMENTS

| | | | |
|---|---|---|---|
| 6,711,622 B1 * | 3/2004 | Fuller et al. ................... 709/231 |
| 6,732,183 B1 * | 5/2004 | Graham ......................... 709/231 |
| 7,543,073 B2 * | 6/2009 | Chou et al. .................... 709/231 |
| 7,941,554 B2 * | 5/2011 | Grigorovitch et al. ........ 709/231 |
| 8,190,674 B2 * | 5/2012 | Narayanan et al. ........... 709/203 |
| 2002/0131496 A1 * | 9/2002 | Vasudevan et al. ....... 375/240.11 |
| 2002/0136298 A1 * | 9/2002 | Anantharamu et al. . 375/240.12 |
| 2003/0023746 A1 * | 1/2003 | Loguinov ...................... 709/235 |
| 2004/0057420 A1 * | 3/2004 | Curcio et al. ................. 370/352 |

(Continued)

OTHER PUBLICATIONS

Zhang, et al. "Network-Adaptive Rate Control with TCP-Friendly Protocol for Multiple Video Objects," IEEE Int'l Conf. on Multimedia and Expo 2000.*

(Continued)

*Primary Examiner* — Patrice Winder
*Assistant Examiner* — Julian Chang
(74) *Attorney, Agent, or Firm* — Great Lakes Intellectual Property, PLLC

(57) ABSTRACT

An adaptive bit rate system for use in transmitting data at adaptable bit rates. The bit rate may be adjusted according to historical behaviors and/or past operational settings, such as but not limited to adjusting a requested bit rate to a different bit rate depending the historical behavior.

18 Claims, 2 Drawing Sheets

(56) References Cited

U.S. PATENT DOCUMENTS

| | | | |
|---|---|---|---|
| 2005/0100100 A1* | 5/2005 | Unger | 375/240.27 |
| 2005/0175090 A1* | 8/2005 | Vetro et al. | 375/240.03 |
| 2006/0126713 A1* | 6/2006 | Chou et al. | 375/225 |
| 2006/0143678 A1* | 6/2006 | Chou et al. | 725/118 |
| 2006/0165011 A1* | 7/2006 | Starr et al. | 370/252 |
| 2006/0165166 A1* | 7/2006 | Chou et al. | 375/240.05 |
| 2007/0058548 A1* | 3/2007 | Babonneau et al. | 370/235.1 |
| 2007/0140116 A1* | 6/2007 | Vega-Garcia | 370/230 |
| 2008/0091838 A1* | 4/2008 | Miceli | 709/231 |
| 2008/0133376 A1* | 6/2008 | Hill | 705/26 |
| 2008/0292005 A1* | 11/2008 | Xu et al. | 375/240.28 |
| 2009/0113048 A1* | 4/2009 | Maze et al. | 709/224 |
| 2009/0125636 A1* | 5/2009 | Li et al. | 709/231 |
| 2009/0185619 A1* | 7/2009 | Taleb et al. | 375/240.02 |
| 2009/0279616 A1* | 11/2009 | Hamanaka | 375/240.27 |
| 2009/0326931 A1* | 12/2009 | Ragot et al. | 704/220 |
| 2010/0062777 A1* | 3/2010 | Nadas et al. | 455/445 |
| 2010/0158109 A1* | 6/2010 | Dahlby et al. | 375/240.03 |
| 2010/0161825 A1* | 6/2010 | Ronca et al. | 709/231 |
| 2010/0189182 A1* | 7/2010 | Hannuksela | 375/240.25 |
| 2010/0199151 A1* | 8/2010 | Lee | 714/774 |
| 2010/0235438 A1* | 9/2010 | Narayanan et al. | 709/203 |
| 2010/0235472 A1* | 9/2010 | Sood et al. | 709/219 |
| 2010/0235528 A1* | 9/2010 | Bocharov et al. | 709/231 |
| 2011/0080940 A1* | 4/2011 | Bocharov et al. | 375/240.01 |
| 2011/0161485 A1* | 6/2011 | George et al. | 709/224 |
| 2011/0170408 A1* | 7/2011 | Furbeck et al. | 370/230 |
| 2011/0176422 A1* | 7/2011 | Nadas et al. | 370/235 |
| 2011/0235528 A1* | 9/2011 | Racz et al. | 370/244 |
| 2011/0258338 A1* | 10/2011 | Vass | 709/233 |
| 2011/0307623 A1* | 12/2011 | George et al. | 709/231 |
| 2011/0307781 A1* | 12/2011 | Sood et al. | 715/716 |
| 2012/0004960 A1* | 1/2012 | Ma et al. | 705/14.4 |
| 2012/0005364 A1* | 1/2012 | Ma et al. | 709/231 |
| 2012/0005365 A1* | 1/2012 | Ma et al. | 709/231 |
| 2012/0278449 A1* | 11/2012 | Wu et al. | 709/219 |
| 2012/0311177 A1* | 12/2012 | Visharam et al. | 709/233 |
| 2013/0013803 A1* | 1/2013 | Bichot et al. | 709/231 |
| 2013/0121487 A1* | 5/2013 | Lorberbaum et al. | 380/44 |
| 2013/0191508 A1* | 7/2013 | Strasman et al. | 709/219 |
| 2013/0286879 A1* | 10/2013 | ElArabawy et al. | 370/252 |
| 2013/0290492 A1* | 10/2013 | ElArabawy et al. | 709/219 |

OTHER PUBLICATIONS

Zimmerman, et al. "A multi-threshold online smoothing technique for variable rate multimedia streams," Springer, 2006.*

Zhang, Qian, Wenwu Zhu, and Ya-Qin Zhang. "Resource allocation for multimedia streaming over the Internet." Multimedia, IEEE Transactions on 3.3 (2001): 339-355.*

De Cuetos, Philippe, and Keith W. Ross. "Adaptive rate control for streaming stored fine-grained scalable video." Proceedings of the 12th international workshop on Network and operating systems support for digital audio and video. ACM, 2002.*

* cited by examiner

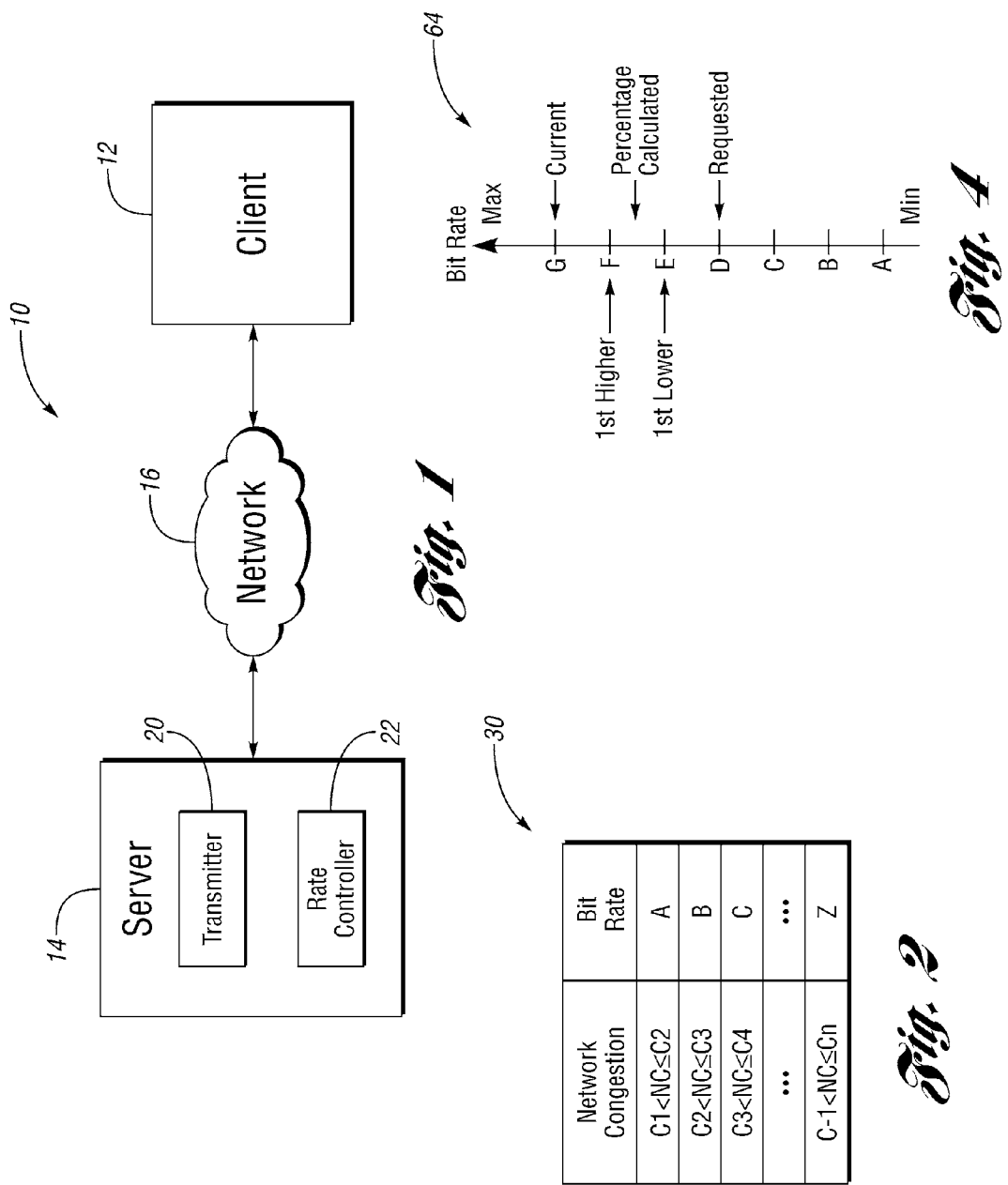

ADAPTIVE BIT RATE FOR DATA TRANSMISSION

TECHNICAL FIELD

The present invention relates to adaptive bit rate systems where a bit rate at which data is transmitted can be adjusted to compensate for network congestion and other transmission related latencies, such as but not limited to adjusting the bit rate at which video is transmitted from a server to a client according to historical bit rate scheduling.

BACKGROUND

The transmission of data, and in particular video data, has exposed a problem on bandwidth-limited shared networks related to the fact that video data often requires a high bandwidth and has temporal constraints. Many Internet Protocol networks were designed for data transmissions requiring low bandwidth and tolerant of highly variable packet delays, which can provide relatively low-bandwidth circuits that do not satisfy inflexible temporal constraints. Such packet networks were designed for the transfer of data between computer systems. The only constraint being that the data eventually arrive at its destination. The bandwidth available for a transfer depends on the degree of congestion in the network. Such packet networks often make no guarantees about when or even in what order the data in a burst of data will arrive at its destination. A packet network may not be well adapted to handle high-bandwidth, bursty data with time constraints.

For users which do not have sufficiently high bandwidth to stream video or which must contend with other traffic that intermittently diminishes available bandwidth for delivery of packets, adaptive bit rate technologies may be used to deliver lower bit rate streams when necessary to maintain continuous viewing by sacrificing some aspects of video quality. If the user's available bandwidth suddenly drops, these adaptive bit rate technologies can make use of an adaptive bit rate stream so that the video source can dynamically lower its streaming rate to compensate for this decreased bandwidth and deliver an uninterrupted video viewing experience that has a lower bandwidth requirement. Likewise, adaptive bit rate technologies may dynamically increase streaming rates when detecting increased bandwidth is available to deliver uninterrupted video viewing with a higher video quality.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates an adaptive bit rate system in accordance with one non-limiting aspect of the present invention;

FIG. 2 illustrates a bit rate map in accordance with one non-limiting aspect of the present invention;

FIG. 4 illustrates a selection chart in accordance with one non-limiting aspect of the present invention.

DETAILED DESCRIPTION

Figure 3:
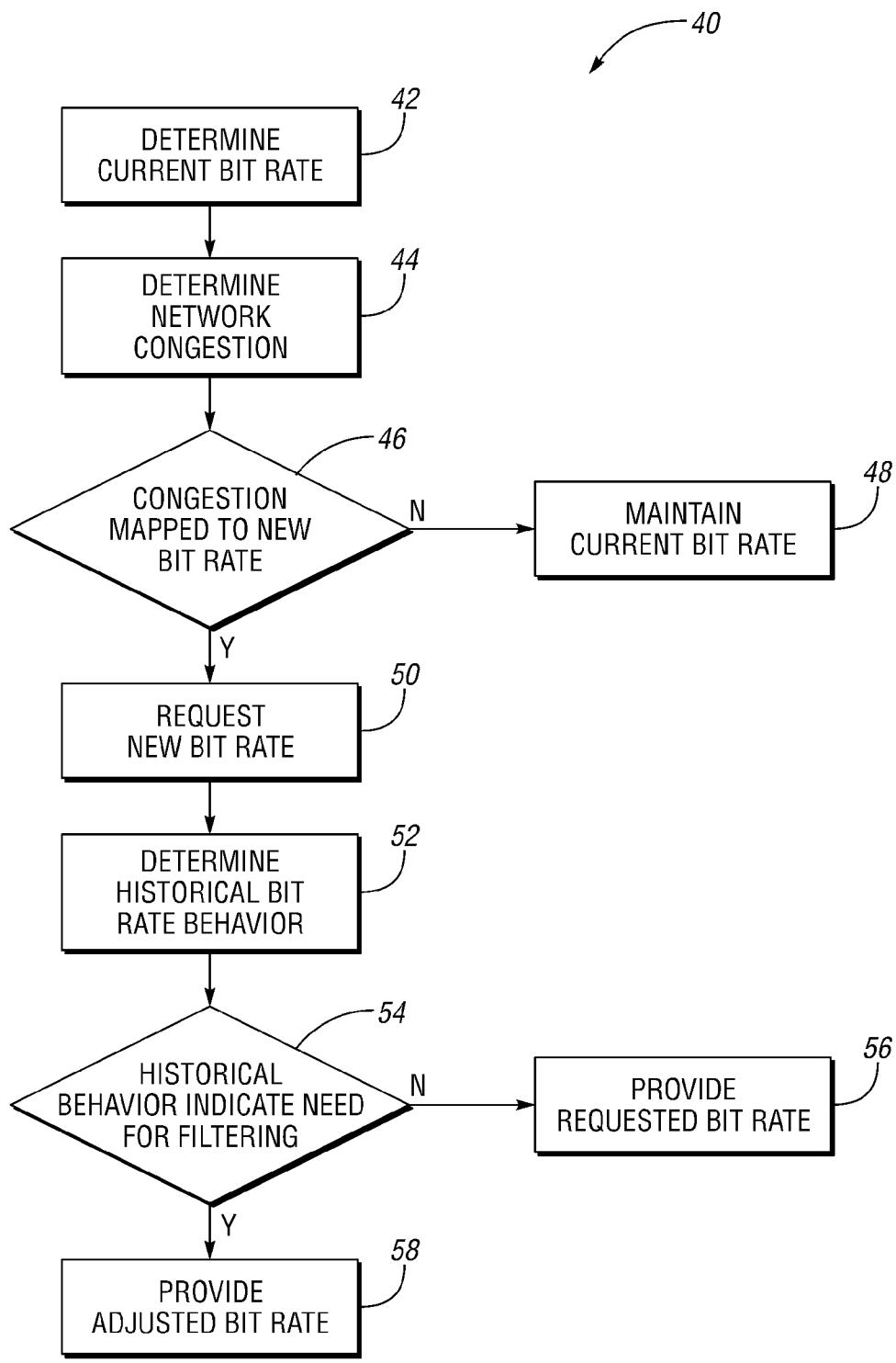
FIG. 3 illustrates a flowchart of an adaptive bit rate method in accordance with one non-limiting aspect of the present invention.

FIG. 1 illustrates an adaptive bit rate system 10 in accordance with one non-limiting aspect of the present invention. The system 10 is shown with respect to supporting data transfer between a client 12 and a server 14 with communications executed over a network 16. This type of client-server arrangement may take place between any two devices where data is transmitted according to an adaptive bit rate model where a bit rate at which the data is transferred is adjusting according to network characteristics, such as congestion, latency, and other influences that affect how quickly the server 14 is able to reliably transmit data to the client 12.

The present invention is predominately described with respect to adapting the selection of whether higher and lower bit rate encoded video is transmitted transported to the client 12 based at least in part on network congestion. The description is provided for exemplary purpose and without intending to unnecessarily limit the scope and contemplation of the present invention. The transfer of video, or more particularly video segments, is but one of many environments where adaptive bit rate methodologies may be utilized in cooperation with the present invention to provide an uninterrupted flow of data segments at the highest possible bit rate levels without negatively influencing the user's experience due to chatter or other variations induced by overly active bit rate adjustments.

The transfer of video or other data from the server 14 to the client 12 may take place over any type or combination of a wireless network (Wi-Fi, satellite, cellular, telephony, etc.) and/or a wireline network (coaxial cable, Ethernet, USB, home power network, etc.). Optionally, different communication protocols, codecs, standards and communication mediums may be simultaneously relied upon to execute the operations contemplated by the present invention depending on the operating demands and capabilities of each of the client 12 and server 14. The server 14 may be configured to dynamically support communications over different and/or multiple networks 16 and according to different requirements in order to facilitate uninterrupted video viewing while the client 12 transitions from one network 16 to another.

The client 12 may be any type of device capable of processing data and/or media for output to a user, such as but not limited to one or some combination of a television, settop box (STB), computer, notebook, mobile device (phone, pda, tablet, etc.) The server 14 may be any type of device capable of transmitting data and/or interfacing media with a user through the client 12, such as but not limited to one or some combination of a digital video recorder (DVR), headend unit, computer, mobile device (phone, pda, etc.)

The server 14 is shown to include a transmitter 20 operably configured to facilitate transmitting video and/or other data to the client 12, including performing any formatting conversions and related transmission-dependent operations in order to facilitate transmitting video to the client 12. The transmitter 20, in particular, may be configured to encode the video at selected bit rates and/or to select between video segments/files previously encoded at certain bit rates. The rate controller 22, as described below in more detail, may be configured to select the bit rate of the video sent from the transmitter 20 according to historical behavior, network congestion, and other influences. Of course, the rate controller 22 may be included as part of the server 14 and/or another element in communication with either one or both of the server 14 and client 12.

FIG. 2 illustrates a bit rate map 30 in accordance with one non-limiting aspect of the resent invention. The bit rate map 30 may be stored in one or both the server 14 and client 12 for use in mapping a listing of available bit rates relative to a listing of network congestion levels. One or both of the client 12 and server 14 may included capabilities to assess or otherwise measure network congestion NC, or at least congestion of a pathway or medium currently being used to transmit the video to the client 12, based on congestion levels perceived from each. The perceived network congestion NC may be mapped to the one of a plurality of bit rates A, B, C, Z used to encode the video segments or other content segments capable of being transmitted to the client 12.

The perceived congestion levels may be determined from test messages sent over the network 16 that track travel time between destinations, reports from intermediary devices (hops) used to support communications between the client 12 and server 14, statistics gathered in the client's TCP/IP network stack, and/or the level of fullness in a buffer holding the data being transmitted. The bit rate map 30 is but one method for relating bit rates to network congestion and is not intended to the limit the scope and contemplation of the present invention, particularly when the present invention is used in cooperation with non-video restricted data transfers. Other arrangements, based on other variables, may similarly be used, such as but not limited to a formula that calculates a specific bit rate based on network congestion, i.e., one that does not require relating network congestion to a predefined listing of available bit rates.

The listing of predefined bit rates is merely presented as some videoformatting may have defined ranges at which it can be preferably encoded, which may be due at least in part to formatting requirements, video quality, expected network link bandwidths and other operation processes. In addition, the present invention refers to bit rate with respect to the bit rate at which the video segments or other content segments are encoded for transport over the network 16. For example, video segments corresponding to the same portion of a video may be encoded at higher and lower bit rates. The higher bit rate encoding results in more data being included for the same length of video than that which would be included at the lower bit rates. The higher bit rate encoding also results in better quality video and greater transmission requirements due to the increased size of each segment. The server 14 may be configured to encode the video upon request and/or the server 14 may include pre-encoded video segments/files that are to be transported at the request of the client 12.

Optionally, the bit rate at which the encoded video segments are transmitted over the network 16 may be similarly controlled in the event the network 16 is of the type that permits such control. The network 16 predominately described by the present invention endeavors to transport the video segments in the fastest manner possible, and in some cases, with the assistance of compression and other processing techniques that may be used to adjust the transfer bit rate of the video segments. The ability of the present invention to controller the bit rate of the encoded video also allows the present invention to control the amount of time taken to transport the video segments at least in so far as the transport time is proportional to the size of the segments, i.e., whether the video segments are encoded at higher or lower bit rates.

FIG. 3 illustrates a flowchart 40 of an adaptive bit rate method in accordance with one non-limiting aspect of the present invention. The method is described with respect to the data transmitted being a video having multiple video segments requiring transmission from the server 14 to the client 12 where network congestion or other influences are used to determine whether the client 12 is to request video encoded at higher or lower bit rates. The client 12 (e.g., rate controller 22) and/or server 14 may include logic or other processing capabilities necessary to implement the operations contemplated to execute the present invention, such as in the form of executable code stored within a computer readable medium.

Block 42 relates to determining a current bit rate of the video being transferred to the client 12. The current bit rate may be determined by the client 12 reviewing the last bit rate request message transmitted to the server 14 and/or from a value stored in a memory. The current bit rate may also be determined by the server 14 based on similar criteria, i.e., according to the request message from the client 12, and/or by checking or measuring the bit rate of video currently being output from the transmitter 20. The current bit rate may be identified by one of the bit rate labels A, B, C, Z, or in the event the current bit rate is provided from a source with a transmitter operable to encode video at selectable bit rates at, the bit rate may be identified by the currently active value.

Block 44 relates to determining network congestion. The network congestion NC may be determined by the client 12 and/or the server 14 based on congestion perceived by each. In the case of conflicting determinations, such as if the client 12 determines the network congestion NC to have a first value and the server 14 determines the network congestion NC to have a second value, the network congestion used to facilitate determining subsequent bit rates may be based on an average of the first and second network congestion values. Optionally, the network congestion NC may be determined based on test message transmitted between the client 12 and server 14 or in a similarly manner that test actually congestion of the path therebetween.

Block 46 relates to comparing the determined network congestion to the bit rate map 30 to determine whether the current network congestion NC maps to another bit rate listed in the bit rate map. In the event the bit rate map 30 is not used, a similar comparison may be made based on the current network congestion NC and the previously occurring network congestion level whereby any difference in congestion may be indicative of a need to adapt the bit rate at which future data is encoded for transport to the client 12. This type of analysis may be used with a transmitter device 20 that is capable of encoding at virtually any bit rate, or at least more bit rates than those specified in the bit rate map 30. The need to adjust the bit rate based on the current network congestion may be made by the client 12 and/or the server 14.

In the event no new bit rate is mapped or calculated, then the current bit rate may be maintained in Block 48. The current bit rate may be maintained without the client 12 and/or server 14 taking any further action, i.e., without transmitting confirmatory messages to each other. Optionally, some communication between the client 12 and server 14 may be required to maintain the current bit rate, such as if the current bit rate is above a normal or average bit rate level a confirmatory message may be required in order to maintain the elevated level. The confirmatory message may be used to notify a system operator of high volume data copying or other extreme activities, which may prompt corrective action in the event that such usage reflects a non-authorized, excessive use of system resources or some other level of operation that may otherwise negatively influence operation of the related network. The corrective action may include an override of the current bit rate level or to send a warning message to the client 12 of increased charges to maintain the current level.

Block 50 is reached in the event a new bit rate should be requested. The client 12 may determine, at least initially, the new bit rate to be a computed bit rate based on the bit rate mapped to for the current network congestion NC listed in the bit rate map 30. In the event the bit rate map 30 is not used, a similar determination may be made based on the current network congestion NC and the previously occurring network congestion level whereby any difference in congestion may be used to compute a proportional change in the bit rate.

Block 52 relates to assessing historical bit rate behavior of the client 12 and/or the communication medium used to transfer the data from the server 14 to the client 12. The historical analysis may be made with respect to current and past bit rate requests and the details associated therewith, such as but not limited to the number and frequency of requests, the requested bit rate levels, a time duration for which each of the current and/or prior bit rates were active, and/or other information reflective of bit rate related behaviors. This historical data can then be used in deciding whether to request the currently computed bit rate or whether to make further adjusts to the computed bit rate based on historical usage.

Block 54 relates to determining whether the currently computed bit rate requires filtering or some other adjustment according to the historical behavior assessed in Block 52. In the event the historical behavior fails to necessitate adjusting the currently computed bit rate, the currently computed bit rate is provided in Block 56 with the rate controller 22 instructing the transmitter 20 to adjust the currently selected bit rate to the currently computed bit rate. In the event the historical behavior does necessitate adjusting the currently computed bit rate, the currently computed bit rate is adjusted in Block 58 and the rate controller 22 request an adjusted bit rate instead of the currently computed bit rate.

The adjusted bit rate may be determined according to the following formula:

$$\text{Adjusted bit rate} = H*\alpha + R*\beta$$

wherein H is a historical bit rate value, R is the currently computed bit rate value, $0<\alpha<1$, and $\beta=1-\alpha$. The historical bit rate value H may be the current bit rate value, an average of the current and previous bit rate values (values of bit rates actually used and/or requested but not used), such as an average of N number of previous bit rates determined according to a rectangular or exponential window function.

The values $\alpha$ and $\beta$ are design parameters that may be selected by a system operator to weigh the significance of each of the historical bit rate H and the requested bit rate R when calculating the adjusted bit rate, e.g., an $\alpha$ value closer to one causes the historical bit rate value to influence the adjusted bit rate value more so than the currently computed bit rate value whereas a sufficiently lower $\alpha$ value causes the currently computed bit rate value to influence the adjusted bit rate value more so than the historical bit rate value. The value assigned to $\alpha$ and $\beta$ may also be automatically determined according to historical behavior, e.g., if the number or frequency of bit rate adjustments is higher then it may be desirable to limit volatility by selecting a greater value for $\alpha$ on the assumption that continued volatility is based on a more rapidly changing requested bit rate values.

The adjusted bit rate may also be determined as a percentage P of a difference between the current bit rate and the currently computed bit rate. The percentage P may be any percentage between 0% and 100% and selected to moderate the amount by which the current bit rate is adjusted relative to the currently computed bit rate, e.g., a value of 0% would prevent any adjustment, a value of 100% would allow complete adjustment to the currently computed bit rate, and a value therebetween would moderate the amount of adjustment to some amount less than the total amount of adjustment required to change from the current bit rate to the currently computed bit rate.

The percentage P may be determined as function of a function of a number or frequency of past bit rate adjustments. The percentage P may be determined to be 0% in the event at least N number of prior bit rate changes occurred within a time period T, such as to prevent the requested adjustment in the event too many adjustments have been recently made. The percentage P may also be determined to be 0% in the event the time duration of the current bit rate is less than a threshold, such as to prevent changing the bit rate if the current bit rate too recently became active. In the event the bit rate resulting from the multiple of the percentage P and the difference between the currently computed bit rate and current bit rate falls between at least two of the bit rate values listed within the bit rate map 30, the adjusted bit rate may be selected to be a next higher or lower one of the two bit rate values.

FIG. 4 illustrates a selection chart 64 for the next higher and lower bit rate values relative to a percentage bit rate value that falls between bit rate F and bit rate E, which may occur if the bit rate values D through G are equally spaced and the percentage value P is 50%. Since the adjusted bit rate may be not available, the bit rate may be further adjusted up to the F bit rate or down to the E bit rate, e.g., in the event the currently computed bit rate is less than the current bit rate, the value may be adjusted up in the event the P value is greater than 50% and down if the P value is less than 50% and in the opposite manner if the request bit rate is greater than the current bit rate based on the assumption that a higher percentage value P is selected when greater variance (volatility) is permitted.

As supported above, at least one non-limiting aspect of the present invention relates to supporting adaptive bit rate video clients with a viewing experience based on network efficiency and adjusted according to historical rate change information (such as rate change frequency) when determining the next bit rate change. In the event bit_rate[n] represents the bit rate a client requests from a server at request interval 'n' and new_computed_rate[n] represent the bit rate a client perceives is necessary based on client's current perceived level of network congestion at request interval 'n'. The value new_computed_rate[n] may be a function based on information from the network stack, video player, and other systems in the transmission path.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of dynamically adjusting a bit rate at which data to be transferred over a network to a client is encoded, the method comprising:

determining a first value reflective of a plurality of bit rates at which data was previously requested to be transferred to the client, the first value being determined at least based in part on one or more prior bit rate requests made by the client;

determining a network congestion of the network;
determining a second value reflective of a bit rate suitable given the network congestion;
determining a third value based on the first and second values;
requesting adjustment of the bit rate to approximately the third value;
determining the third value according to the following equation:

third value=first value*α+second value*β wherein 0<α<1, and β=1−α; and
determining the first value according to the plurality of bit rates where at least portion of the plurality of bit rates correspond with bit rates specified in prior bit rate requests that were not correspondingly used to transfer data to the client.

2. The method of claim 1 further comprising determining the first value to be one of:
an average determined according to a rectangular window function of the plurality of bit rates at which data was previously requested to be transferred to the client; and
an average determined according to an exponential window function of the plurality of bit rates at which data was previously requested to be transferred to the client.

3. The method of claim 1 further comprising determining the second value to be a selected rate value selected from a plurality of rate values identified within a bit rate map, the bit rate map associating each of the plurality of rate values with one of a plurality of network congestion values representative of network congestion, the selected rate value corresponding with the one of the plurality of rate values associated with the determined network congestion.

4. The method of claim 3 further comprising the client determining the network congestion as a function of network traffic perceived by the client, including determining the network traffic perceived by the client as a function of test messages transmitted over the network to track travel times between destinations.

5. The method of claim 3 further comprising the server determining the network congestion as a function of messages received from the client marking time taken to receive data transmitted to the client over the network.

6. The method of claim 3 further comprising determining the selected rate value to correspond with the one of the plurality or rate values most closely matching with the determined network congestion.

7. The method of claim 3 further comprising determining the selected rate value to correspond with the one of the plurality of rate values matching with the determined network congestion, and if no matching occurs, the next higher one of the plurality of rate values listed within the bit rate map if available otherwise the next lower.

8. The method of claim 1 further comprising determining the third value to correspond with the first value as adjusted in proportion to a difference between the first value and the second value.

9. The method of claim 8 further comprising adjusting the first value by a percentage of the difference between the first value and the second value.

10. The method of claim 9 further comprising determining the percentage to be 0% in the event at least N number of bit rate changes occurred within a time period T.

11. The method of claim 9 further comprising determining the percentage to be 0% in the event the time duration of the first value rate is less than a threshold.

12. A non-transitory computer-readable medium having instructions sufficient for controlling a server to transmit a video to a client at variable bit rates throughout a running length of the video in order to maintain continuous viewing, the non-transitory computer-readable medium comprising instructions sufficient for:
determining a bit rate at which the server transmits data according to the following formula:

bit rate=first value*α+second value*β wherein:
(i) the first value equals an average of a plurality of bit rates at which at least a portion of the video has already been transferred or requested to be transferred to the client;
(ii) the second value equals a bit rate being requested by the client, the second value differing from a last one of the plurality of bit rates already used to transfer a portion of the video to the client;
(iii) 0 <α<1;
(iv) β=1−α; and
determining the first value according to the plurality of bit rates where at least portion of the plurality of bit rates correspond with bit rates requested but not used to transfer data to the client.

13. A video server comprising:
a transmitting device operable to transmit video over a network to a client at a bit rate;
a controller operable to set the bit rate at which the video is transmitted based on the following formula:

bit rate=first value*α+second value*β wherein:
(i) the first value equals an average of a plurality of bit rates at which data was previously transferred to the client or requested to be transferred to the client;
(ii) a second value equals a bit rate currently being requested by the client;
(iii) 0<α<1;
(iv) β=1−α; and
wherein the controller determines the first value according to the plurality of bit rates where at least portion of the plurality of bit rates correspond with bit rates requested but not used to transfer data to the client.

14. The server of claim 13 wherein the first value is an average determined according to a rectangular window function of the plurality of bit rates.

15. The server of claim 13 wherein the first value is an average determined according to an exponential window function of the plurality of bit rates.

16. The server of claim 13 wherein the controller instructs the client to select the requested bit rate from a listing of available bit rates.

17. The server of claim 16 wherein the controller sets the bit rate to the one of the listing of available bit rates that is closest to the bit rate calculated by the formula such that controller sets to bit rate to a value different than that associated with the requested bit rate.

18. The server of claim 13 wherein the controller sets the bit rate to the bit rate currently requested by the client in the event a frequency of past bit rate changes is less than a threshold and a time duration of the currently set bit rate is greater than a threshold, the requested bit rate differing from the bit rate determined with the formula.

* * * * *